Patented Nov. 26, 1929

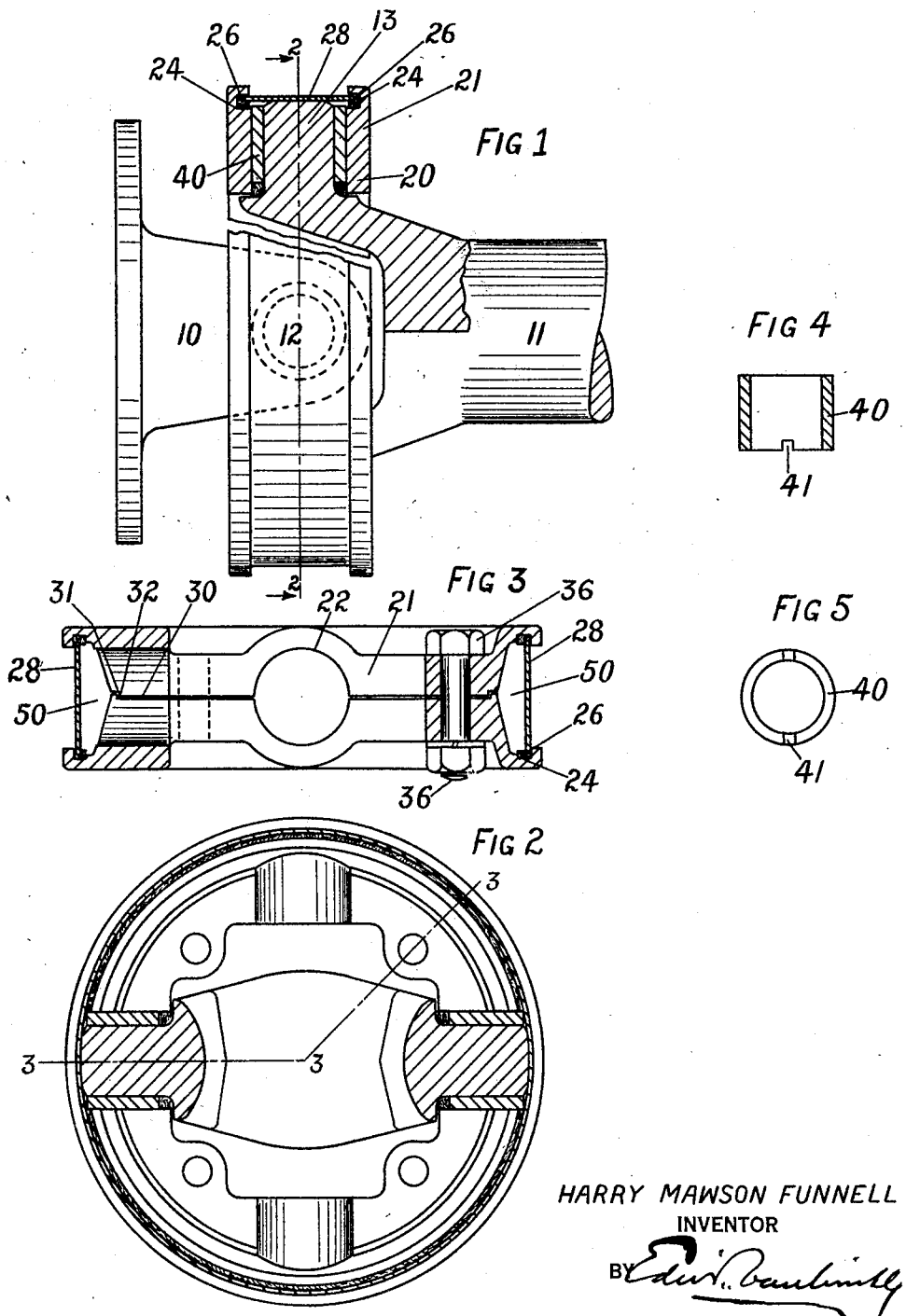

1,737,535

UNITED STATES PATENT OFFICE

HARRY MAWSON FUNNELL, OF NEW MARKET, NEW JERSEY

UNIVERSAL JOINT

Application filed June 15, 1928. Serial No. 285,553.

This invention relates to universal joints, and more particularly to joints of the character wherein the trunnions are mounted in and connected by a member in the shape of a ring having a chamber or chambers for lubricant therein and more particularly to a ring type joint in which the side thrust is taken on the end of the trunnions or pin. It is the general purpose and object of the invention to provide a construction of a universal joint of this character in which the side thrust is taken on an annular member which is of such a section to allow of deflection to compensate for slight variation in length of trunnions or pin during assembly, also to provide a joint which is cheap of manufacture and which is easily assembled and dis-assembled.

A further object is to provide a simple and cheap construction in which the sealing is obtained by the bushings and rabbeted joint in the ring member which is filled with a film of shellac or equivalent in the plane parallel to the center line of the shaft yoke, thereby providing a sealing point unaffected by centrifugal force.

The foregoing and other features of my invention will now be described in connection with the accompanying drawings forming part of this specification in which I have represented my universal joint in its preferred form after which I shall point out more particularly in the claims those features which I believe to be new and of my own invention.

In the drawings:

Figure 1 is a side elevation, in part section of my universal joint.

Figure 2 is a section along the line 2—2 Fig. 1 with the yoke 10 removed.

Figure 3 is a section of the complete torque ring along the line 3—3—3 Figure 2.

Figures 4 and 5 are details of the bushings employed.

In the construction illustrated 10 and 11 are driving or driven members each provided with trunnions embraced in a torque ring 20 which comprises all the features of a standard ring type universal joint. In the construction shown the member 10 is a standard flanged yoke provided with a through cross pin 12 the ends of which serve as the driving trunnions while the member 11 is a bifurcated yoke supporting two trunnions 13 which in the construction shown are the driven members. These four trunnions are embraced in a torque ring 20 which in this case comprises two circular members 21 each provided with four semi-circular recesses 22 extending radially from the inside of the ring forming seats for the bushings 40 which form bearings for the trunnions of the driving and driven members. The periphery of each ring member 21 is slightly extended beyond the ends of the trunnions and is provided with a circular groove 24 to accommodate rings of packing material 26.

A ring or piece of tubing 28 is provided to interfit in the packing grooves 24 and be sealed with the packing 26 when the members 21 are bolted together by bolts 36. The ring members 20 are brought together at 30 with a rabbeted joint 31 providing a part of the joint 32 parallel to the center line of the shaft yoke and at right angles to line of action of centrifugal force. During assembly a film of shellac is formed within this slot 32 which is not affected by centrifugal force.

It will also be noticed that the trunnions 13 bear against the inside of the annular ring member 28. The object of this flexible member 28 is to provide a means to take the side thrust and to compensate for slight variation in length of pin, or trunnions during assembly. This ring is clamped into the packing rings 24 providing the outer member of the lubricant containing chamber and absolutely seals this chamber at this point against leakage.

Interposed between the ring member 20 and the trunnions I provide bushings 40 provided with a notch 41 across one end which provides a communication from the lubricant containing chamber 50 to the top of the trunnion.

The packing rings 26 are wide and provide for reasonable distortion of the ring 28 in assembly.

It will be observed that when the ring members 20 are clamped together with the bolts 36 the bushings 40 are clamped solidly in the recess 22 and that the flat portions 30 of the ring members do not necessarily come in contact, and that the joint is sealed by the rabbeted joint 32 having formed therein a film of shellac. This film being in a plane at right angles to the action of centrifugal force, with this construction there is no tendency to rupture the film and to permit the lubricant to escape.

Where the rabbet joint 32 is interrupted by the curved surfaces 22 the sealing is effected by the bushings 40 conforming to the contour of the surface 22. To insure this the walls of the bushings are made of such a section as to allow a slight deflection.

I claim:

1. In a universal joint of the ring type, driving and driven members each carrying trunnions in combination with a two piece torque ring comprising a lubricant containing chamber, bushings rigidly clamped between the ring sections forming bearings for the trunnions, the two ring sections when clamped together forming a rabbeted joint, said rabbeted joint located between the axis of the universal joint and the lubricant containing chamber.

2. The device of claim 1 with the addition of a flexible ring member adapted to interfit with grooves in the outside periphery of the torque ring.

3. The device of claim 1 with the addition of a flexible ring clamped between the torque ring section and adapted to carry the side thrust when in clamped position and flexible enough to be distorted to accommodate varying lengths of pins and over all of trunnions during assembly.

4. The device of claim 1 with the addition that the wall of the bushings are of such a section that they may be distorted to form the same contour as the recesses in which they are placed.

In testimony whereof I affix my signature.

HARRY MAWSON FUNNELL.